US006692145B2

(12) United States Patent
Gianchandani et al.

(10) Patent No.: US 6,692,145 B2
(45) Date of Patent: Feb. 17, 2004

(54) MICROMACHINED SCANNING THERMAL PROBE METHOD AND APPARATUS

(75) Inventors: Yogesh B. Gianchandani, Ann Arbor, MI (US); Mo-Huang Li, Madison, WI (US); Julius Wu, Fremont, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/001,919

(22) Filed: Oct. 31, 2001

(65) Prior Publication Data

US 2003/0081651 A1 May 1, 2003

(51) Int. Cl.[7] .............................. G01K 7/24; G01K 7/04
(52) U.S. Cl. ........................................ 374/185; 374/179
(58) Field of Search ............................... 374/179, 183, 374/185, 142, 44, 114; 136/225, 201, 221; 338/225 D, 211, 314, 202; 324/762, 754; 73/105

(56) References Cited

U.S. PATENT DOCUMENTS

| | | | | | |
|---|---|---|---|---|---|
| 3,531,990 A | * | 10/1970 | Shinskey | ..................... | 374/114 |
| 3,683,671 A | * | 8/1972 | Van Swaay | ................... | 374/44 |
| 3,688,581 A | * | 9/1972 | Le Quernec | ................ | 374/173 |
| 3,852,570 A | * | 12/1974 | Tyler | ............................ | 374/183 |
| 4,103,275 A | * | 7/1978 | Diehl et al. | .................. | 374/183 |
| 4,143,549 A | * | 3/1979 | Koehler | ....................... | 374/114 |
| 4,413,917 A | * | 11/1983 | Cooper | ........................ | 374/183 |
| 5,051,379 A | * | 9/1991 | Bayer et al. | .................... | 216/2 |
| 5,181,007 A | * | 1/1993 | Friese et al. | ................. | 374/185 |
| 5,347,224 A | * | 9/1994 | Bachmann et al. | ......... | 324/724 |
| 5,356,218 A | * | 10/1994 | Hopson et al. | ............. | 374/142 |
| 5,410,291 A | * | 4/1995 | Kuzuoka | .................... | 374/185 |
| 5,411,600 A | * | 5/1995 | Rimai et al. | ................. | 136/225 |
| 5,441,343 A | * | 8/1995 | Pylkki et al. | ................. | 374/44 |
| 5,475,318 A | * | 12/1995 | Marcus et al. | .............. | 324/762 |
| 5,753,911 A | * | 5/1998 | Yasuda et al. | .............. | 369/126 |
| 5,772,325 A | * | 6/1998 | Hopson et al. | ............. | 374/142 |
| 5,823,680 A | * | 10/1998 | Kato et al. | ................... | 374/185 |
| 5,923,637 A | * | 7/1999 | Shimada et al. | ............ | 369/126 |

(List continued on next page.)

OTHER PUBLICATIONS

L.E. Ocola, et al., "Latent Image Formation: Nanoscale Topography and Calorimetric Measurements in Chemically Amplified Resists," J. Vac. Sci. Technology B, vol. 14, No. 6, Nov./Dec. 1996, pp. 3974–3979.

(List continued on next page.)

Primary Examiner—Diego Gutierrez
Assistant Examiner—Mirellys Jagan
(74) Attorney, Agent, or Firm—Foley & Lardner

(57) ABSTRACT

A micromachined thermal probe has a substrate with a surface and an edge, and at least one flexible probe body formed on the substrate that includes a cantilever beam section that extends from a proximal end outwardly to a distal end. A pair of conductors in the probe body extend to a junction at the distal end at which is formed a probe tip. Current passed through the conductors to the junction heats the probe tip, with changes in the effective probe resistance occurring as the probe tip is scanned over a sample with different thermal conductivities at different positions. A second flexible probe body may be mounted to the substrate and constructed similarly to the first probe body to act as a reference probe to allow compensation of the first probe. The probe body may be formed of layers of flexible polymer joined together over pairs of conductors, which is bent back onto itself and secured together at a proximal end of the cantilever beam.

39 Claims, 9 Drawing Sheets

U.S. PATENT DOCUMENTS

| | | | | |
|---|---|---|---|---|
| 5,936,237 | A | * | 8/1999 | van der Weide ............ 250/234 |
| 5,976,390 | A | * | 11/1999 | Muramatsu ..................... 216/2 |
| 6,019,505 | A | * | 2/2000 | Bonne et al. ................. 374/44 |
| 6,064,201 | A | * | 5/2000 | Cha et al. ................... 324/762 |
| 6,095,679 | A | * | 8/2000 | Hammiche et al. ........... 374/43 |
| 6,351,030 | B2 | * | 2/2002 | Havens et al. .............. 257/737 |
| 6,357,279 | B1 | * | 3/2002 | Willis ........................ 73/25.03 |
| 6,406,181 | B1 | * | 6/2002 | Mueller et al. ............. 374/185 |
| 6,520,778 | B1 | * | 2/2003 | Eldridge et al. ............ 324/762 |
| 6,552,339 | B1 | * | 4/2003 | Gupta et al. .................. 73/105 |
| 2002/0008530 | A1 | * | 1/2002 | Kim et al. ................... 324/754 |
| 2002/0079445 | A1 | * | 6/2002 | Hantschel et al. .......... 250/306 |
| 2002/0153911 | A1 | * | 10/2002 | Cho et al. ................... 324/754 |
| 2003/0112844 | A1 | * | 6/2003 | Cordes et al. ................. 374/29 |

OTHER PUBLICATIONS

Hiroshi Ito, "Chemically Amplified Resists: Past, Present, and Future," SPIE vol. 3678, 1999, pp. 2–12.

A. Majumdar, "Scanning Thermal Microscopy," Annu. Review Mater. Sci., vol. 29, 1999, pp. 505–585.

P. Vettiger, et al., "The Millipede—More than One Thousand Tips for Future AFM Data Storage," IBM J. Res. Develop., vol. 44, No. 3, May, 2000, pp. 323–340.

Julius J. Wu, "Design, Fabrication, and Testing of Polyimide MEMS for Scanning Thermal Microscopy," Master of Science thesis, Department of Electrical and Computer Engineering, University of Wisconsin—Madison, 1999, pp. 1–54.

M.H. Li, et al., "High Performance Scanning Thermal Probe Using a Low Temperature Polyimide–Based Micromachining Process," IEEE Int. Conf. on Micro Electro Mechanical Systems (MEMS '00), Miyazaki, Japan, Jan., 2000.

Mo–Huang Li, et al., "Microcalorimetry Applications of a Surface Micromachined Bolometer–Type Thermal Probe," J. Vac. Sci. Technol. B, vol. 18, No. 6, Nov./Dec. 2000, published on–line Dec. 6, 2000.

Mo–Huang Li, et al., "Surface Micromachined Polyimide Scanning Thermocouple Probes," J. of Microelectromechanical Systems, vol. 10, No. 1, Mar. 2001.

* cited by examiner

MICROMACHINED SCANNING THERMAL PROBE METHOD AND APPARATUS

FIELD OF THE INVENTION

This invention pertains generally to the field of scanning thermal probes and particularly to micromachined thermal probes.

BACKGROUND OF THE INVENTION

A variety of scanning thermal probes have been developed for mapping spatial variations in surface temperatures or the thermal properties of samples. The transducing elements for such devices have included thermocouples, Schottky diodes, bolometer-type resistance change devices, and bimorphs. A bolometer-type sensing element, which maps temperature by fractional changes in electrical resistance, has certain advantage for microcalorimetry applications. In particular, the resistor in the probe can be used to supply heat if sufficient current is passed through it. Because the tip temperature is ultimately influenced by the heat flow between the tip and the sample, variations in thermal conductivity across the sample can be mapped by such a probe. If the heat is supplied by periodic signal, local variations in thermal capacity can also be measured. In essence, because the probe tip serves as a point source of heat as well as a temperature sensor, such devices can be used as a spatially localized microcalorimeter. See A. Hammiche, et al., J. Vac. Sci. Technol. B., Vol. 14, 1996, pp. 1486, et seq.; L. E. Ocola, et al., Appl. Phys. Lett., Vol. 68, 1996, pp. 717, et seq.; D. Fryer, et al., Proc. SPIE, Vol. 333, 1998, pp. 1031, et seq.

Lithography-based micromachining techniques previously used for fabricating scanning probes have generally relied on the removal of the scanning probe from its host substrate or the dissolution of a portion of the substrate in order to provide the necessary clearance for the scanning tip. A fabrication process based on surface micromachining that avoids the need to remove the probe from the substrate is described in M. H. Li, et al., Proceedings of the IEEE International Conference on Micro Electro Mechanical Systems (MEMS '00), Miyazaki, Japan, January 2000, pp. 763–768. The fabrication process described therein exploits the mechanical flexibility of polyimide to implement an assembly technique that eliminates the need for probe removal or wafer dissolution. An additional benefit of polyimide is that it offers a very high degree of thermal isolation—its thermal conductivity is 0.147 W/mK, in contrast to a thermal conductivity of 141.2 W/mK for silicon. In addition, because this fabrication process has a small thermal budget, it allows the thermal probes to be postprocessed onto integrated circuit chips.

SUMMARY OF THE INVENTION

In accordance with the invention, a micromachined scanning thermal probe provides highly sensitive thermal conductance measurements on a wide variety of materials, including heat insulating material such as photoresists and relatively soft material such as biological specimens. The flexibility of the probe allows the tip of the probe to be brought into close proximity to or even into contact with the material being scanned without affecting the material. The scanning probe can also be utilized to carry out topographical measurements by utilizing the probe in a manner similar to an atomic force microscope probe. The probe tip may be heated to progressively higher temperatures while in contact with a sample to allow the detection of the localized glass transition temperature of the sample material at the position of the probe tip.

A micromachined thermal probe in accordance with the invention includes a substrate with a surface and an edge. A flexible probe body includes a cantilever beam section that extends from a proximal end that is secured to the substrate surface outwardly from the edge of the substrate to a distal end. A pair of conductors in the probe body extend to a junction at the distal end of the cantilever beam to allow passage of current through the conductors and through the junction. A probe tip extends away from the cantilever beam at the distal end of the beam in a direction away from the substrate surface and includes a thermally conductive portion which is thermally connected to the conductors at the junction of the conductors. As current is passed through the conductors and through the junction between the conductors, the junction is heated to heat the tip. A change in the thermal conductance of a sample adjacent to or in contact with the tip will change the effective resistance of the conductors and the junction, allowing changes in thermal conductivity as the probe tip is scanned across a sample to be determined. A second flexible probe body may be mounted to the substrate spaced from the first flexible probe body and may be formed to have the same structure as the first flexible probe body. The conductors formed in the second flexible probe body may be utilized as a reference resistance to facilitate compensation of the signal obtained from the conductors in the first probe body to account for ambient conditions such as temperature, etc.

The probe body may be formed of two layers of flexible polymer, such as polyimide, which are joined together over the pair of conductors. The probe bodies may be formed in place on a substrate, such as single crystal silicon, over a sacrificial layer on the substrate surface. After the structure of the probe body is completed, the sacrificial layer may be dissolved to allow release of the probe body from the substrate, with the probe body then being bent back on itself and secured to itself at the proximal end of the cantilever beam, with the cantilever beam then extending outwardly from the edge of the substrate. Layers of gold may be formed on the probe body, which are brought into contact as the probe body is bent over on itself, with the gold layers bonded together by compression bonding to form a strong anchor for the cantilever beam.

The conductors of the thermal probe may be connected in an arm or arms of a Wheatstone bridge circuit to allow current to be provided to the probe conductors and to allow measurement of the resistance of the probe conductors as the probe tip is scanned across a sample. The change in probe resistance may be measured directly to allow determination of changes in thermal conductance, or a feedback circuit may be utilized to supply current to the Wheatstone bridge to maintain a constant temperature at the tip, with the thermal conductance determined from changes in the current signal applied to the probe conductors.

The thermal probes in accordance with the invention are preferably formed utilizing microelectromechanical processing techniques and are preferably formed with dimensions in the range of hundreds of microns or less, e.g., with cantilever beam lengths in the range of 100 to 500 $\mu$m, beam widths less than 100 $\mu$m, and beam thicknesses of 3 to 10 $\mu$m.

Further objects, features and advantages of the invention will be apparent from the following detailed description when taken in conjunction with the accompanying drawings.

DETAILED DESCRIPTION OF THE INVENTION

Figure 1:
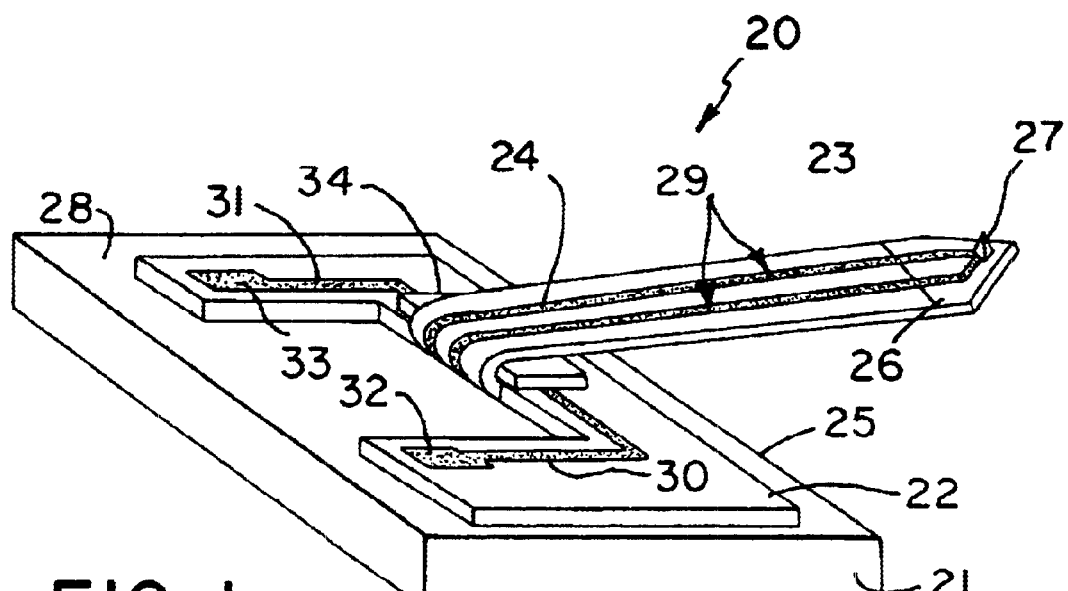
FIG. 1 is a simplified view of a scanning thermal probe in accordance with the invention.

With reference to the drawings, a thermal probe in accordance with the present invention is shown generally at 20 in FIG. 1. The probe 20 is formed by planar processing techniques on a substrate 21 and may include a base 22 (e.g., for electrical and/or thermal insulation from the substrate) on the surface of the substrate, if desired. The probe has a flexible probe body that includes a cantilever beam section 23 which is secured to the substrate at a proximal end 24 and which extends out beyond an edge 25 of the substrate and which terminates at a distal end 26 at which is mounted a probe tip 27. The probe tip extends from the distal end of the cantilever beam outwardly in a direction away from the surface 28 of the substrate. A pair of electrical conducting lines 29 are formed in the probe body cantilever beam 23 and are electrically connected to conducting lines 30 and 31 formed on the base 22 which extend from contact pads 32 and 33, respectively. The conducting lines extend to the distal end of the cantilever beam where they are electrically connected at a junction. The cantilever beam 23 is secured at its proximal end to an anchor 34 to hold it in the position extending out past the edge 25 of the substrate. If desired, a mirror may be formed on the cantilever beam at its distal end 26 on the surface of the beam opposite the probe tip 27 to allow determination of the position of the probe tip, as discussed further below. As also discussed further below, the conductors 29 may be formed as thin film metal conducting strips sandwiched between two layers of flexible polymer, such as polyimide, which form the probe body including the cantilever beam 23. The conducting portion of the scanning tip 27 may be formed of the same metal that forms the strips 29. The two conducting lines 29 are electrically connected together at the tip 27 so that current can be passed through the electrical conductor material at the tip 27. Typical dimensions of the cantilever beam 23 are a length from the edge 25 of the substrate to the tip of the distal end 26 in the range of 100 to 500 $\mu$m (e.g., 350 $\mu$m), less than 100 $\mu$m in width between side edges of the beam (e.g., 50 $\mu$m), and 3–10 $\mu$m in thickness between flat top and bottom beam surfaces. The probe tip 27 typically extends 5–6 $\mu$m from the surface of the cantilever beam 23 at the distal end 26 of the beam.

Figure 2:
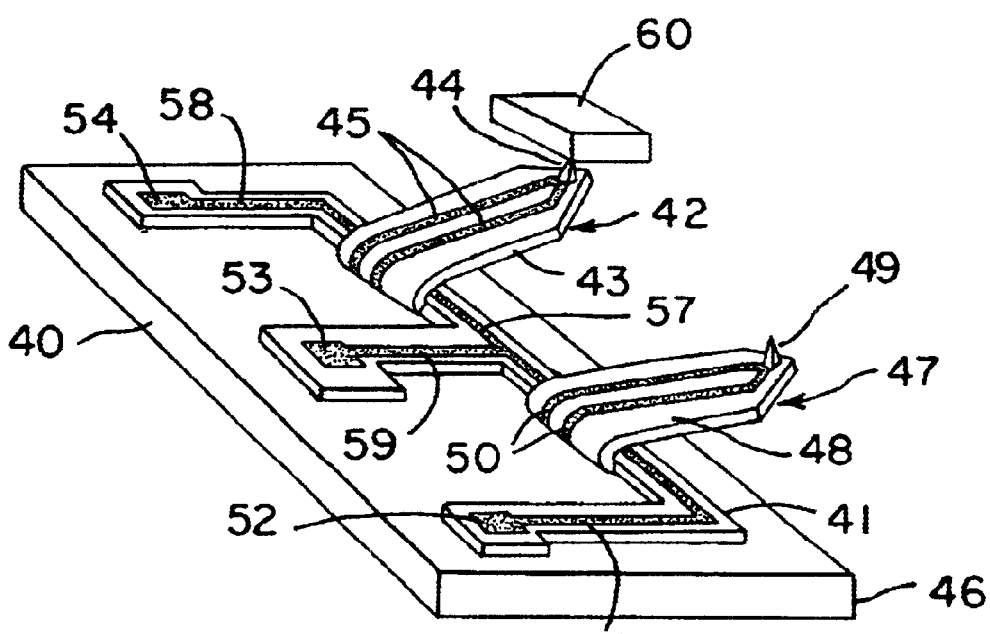
FIG. 2 is a simplified view of a scanning thermal probe in accordance with the invention having a reference probe.

FIG. 2 illustrates a preferred embodiment of the present invention wherein two cantilever probe tips are electrically connected in series, with one of the tips acting as a reference. The probe system of FIG. 2 is formed as discussed above on a substrate 40 on which is deposited a base material 41. A first probe body 42 has a cantilever beam 43 with a tip 44 at its distal end, and a pair of electrical conductors 45 are formed in the probe body and extend to a junction at the distal end of the cantilever beam 43. The cantilever beam 43 extends outwardly beyond an edge 46 of the substrate. A second reference probe body 47 extends outwardly beyond the edge 46 of the substrate and is similarly formed with a cantilever beam 48, probe tip 49 at its distal end, and a pair of conductors 50 extending to a junction at the tip 49. Contact pads 52, 53, and 54 extend to conductors 56, 57, and 58 which are connected to the conductors 50 and 45 in the probes 47 and 44, respectively, with the conductors 56, 57, and 58 connecting the probe conductors 50 and 45 in series between the contact pads 52 and 54. The contact pad 53 is electrically connected by a conducting line 59 to the conducting line 57 which extends between the probe bodies. As discussed further below, the second or reference probe 47 can be utilized to provide a reference resistance for the sensing probe 42. For illustration, the sensing probe 42 is shown with its tip 44 mounted adjacent to a sample shown illustratively at 60 in FIG. 2. As an alternative, a reference resistor can be formed on the same probe body using an additional set of conductors extending to a junction away from the tip.

The thermal probes of FIGS. 1 and 2 can be utilized for sensing variations in the thermal conductivity of a sample surface. A current is passed through the conductors of the probe to cause joule heating at the tip of the probe. The probe is mounted in a conventional scanning mount of the type used in atomic force microscopes to allow scanning of the probe tip near to or in contact with a sample surface. Variations in heat flow between the tip and the sample, influenced by local variations in the thermal conductivity of the sample, are measured by monitoring the probe resistance and are then used to construct the scanned image. This mode of operation can be executed with constant input current, or with the tip maintained at a constant temperature by using a feedback circuit to control the tip heating. The probe may also be utilized as a spatially localized calorimeter. In this mode, rather than heating an entire sample, such as in a conventional differential scanning calorimeter, only the region in the vicinity of the tip is heated. A change in the property of the sample material that occurs as the probe temperature is ramped up will generally affect the temperature change per unit input power. This presents itself as a change in the slope of the plot of the probe resistance versus input power. This method can be used to determine, for example, the glass transition temperature (Tg) of photoresists, as discussed below.

Figure 3:
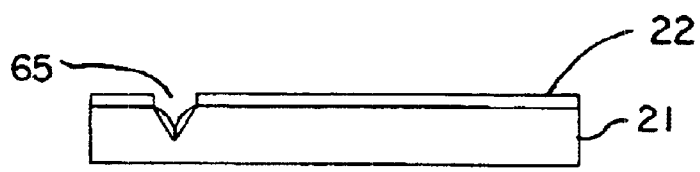
FIG. 3 is a simplified view of a substrate with layers deposited thereon during an initial step in the fabrication of a probe in accordance with the invention.
Figure 4:
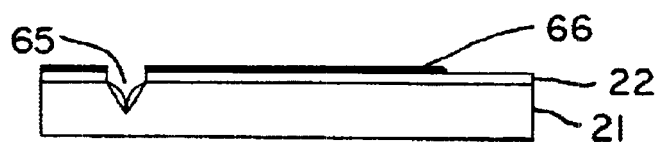
FIG. 4 is a view as in FIG. 3 at a further stage in the fabrication process.
Figure 5:
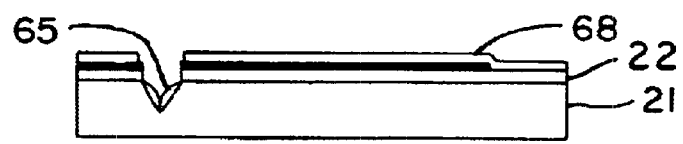
FIG. 5 is a view as in FIG. 4 at a further stage in the fabrication process.
Figure 6:
FIG. 6 is a view as in FIG. 5 at a further stage in the fabrication process.
Figure 11:
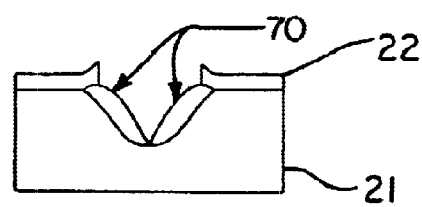
FIG. 11 is a view as in FIG. 10 after growth of a thermal oxide in the notch.

An exemplary sequence for the fabrication of the thermal probes in FIGS. 1 and 2 in accordance with the invention is illustrated with respect to FIGS. 3–11. The fabrication sequence is illustrated with respect to the structures of the single probe 20 of FIG. 1, and the same sequence may be used to form the double probe of FIG. 2. As shown in FIG. 3, a single crystal silicon substrate 21 is utilized with a base layer 22 of silicon nitride formed thereon. An opening in the silicon nitride allows the formation of a pyramidal notch 65 by anisotropic wet etching of a (100) oriented silicon substrate 21. The anisotropic etching self-terminates to provide a pyramidal notch 5–6 $\mu$m deep. An oxidation step may be utilized to sharpen the mold for the tip, as discussed below. A longitudinal trough or troughs (not shown) may also be etched in the silicon (preferably to a shallower depth than the notch) to result in formation of a rib or ribs on the beam to add rigidity to the beam. As shown in FIG. 4, a sacrificial layer of titanium 66 (e.g., 2 $\mu$m thick) is deposited and patterned. As shown in FIG. 5, a first polyimide layer 68 is then applied in areas except for the field regions and the region of the notch 65. The conductor (resistive) leads 29, conductors 30 and 31, and the pads 32 and 33 are then formed, e.g., by 4,000 Å thick sputter deposited films of nickel and tungsten, which are also deposited into the region of the notch 65. The metal used is preferably not attacked by buffered HF since this acid is used to etch away the sacrificial layer of Ti at the end of the process. The metal conductors 29 along the shank of the probe cantilever beam may be wider, thicker or both than the conducting metal 69 deposited at the junction of the conductors in the notch 65, to reduce the resistance of the leads 29 relative to the resistance of the junction material 69 at the tip. The leads 29 may also be formed of different materials than the junction conducting material at the tip. Anisotropic etching of the silicon substrate naturally yields a tip diameter of about 200 nm, as shown schematically in FIG. 10. When an oxide 70 is thermally grown in the silicon in the notch, the point of the notch is sharpened, as illustrated in FIG. 11, resulting in a tip diameter in the range of about 50 nm. The oxidation may be carried out at a typical temperature of 950° C. to a 4,000 Å thickness of the oxide 70.

Figure 7:
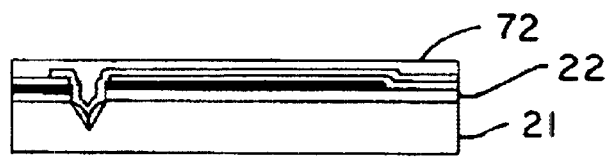
FIG. 7 is a view as in FIG. 6 at a further stage in the fabrication process.
Figure 8:
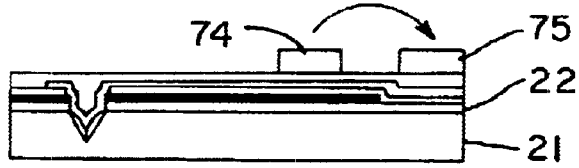
FIG. 8 is a view as in FIG. 7 at a further stage in the fabrication process.
Figure 9:
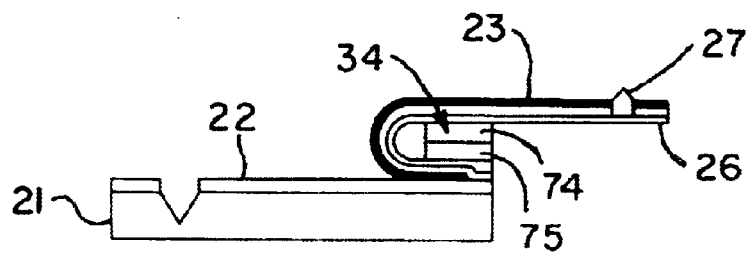
FIG. 9 is a view as in FIG. 8 at a final stage in the fabrication process in which the cantilever beam section of the probe body is freed from the substrate and secured in position.
Figure 10:
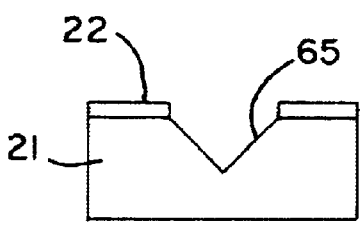
FIG. 10 is a simplified cross-sectional view illustrating a notch in a substrate for forming the probe tip.

After forming of the metal layer(s) for the conductors 29 in the cantilever beam and for the conducting layer 69 at the tip, an upper polyimide layer 72 is deposited over the conductors 29 and the first polyimide layer and is patterned, as illustrated in FIG. 7, and the final structure is masked to expose areas for deposit of two separated gold layer segments 74 and 75 as shown in FIG. 8. Exemplary thickness for the layers 74 and 75 are typically under 1 $\mu$m, e.g., 0.4 or 0.5 $\mu$m. The segment 74 is formed over a region that will become part of the cantilever beam, whereas the segment 75 is formed over a region that will remain fixed to the substrate at the proximal end of the cantilever beam. Finally, as illustrated in FIG. 9, the titanium sacrificial layer 66 is etched away with HF, releasing the probe body formed of the polyimide layers 68 and 72 (with the conductors 29 between them). Generally, sacrificial layer release holes in the probe body are not needed with a titanium sacrificial layer, but may be helpful if other sacrificial layer materials are used. The probe body is then bent up and over as shown in FIG. 9 until the gold segments 74 and 75 contact each other. The gold segments 74 and 75 are thermal-compression bonded together to form the anchor 34. Examples of bonding temperatures are 160° C. and 180° C., although other temperatures may be used. The thin gold layers 74 and 75 bond together strongly, providing a strong and stable anchor for the cantilever beam.

Figure 12:
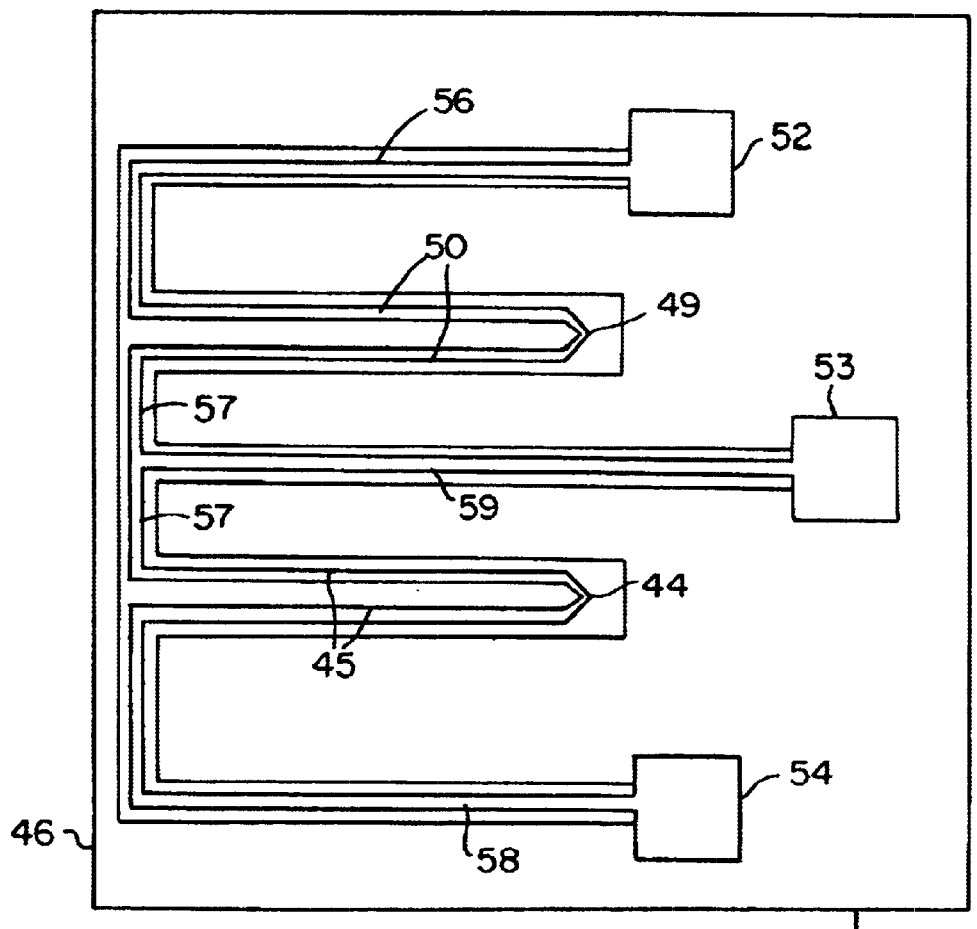
FIG. 12 is a perspective view of the layout of the probe bodies with conductors therein on a substrate for formation of the thermal probe having a reference probe as shown in FIG. 2.

The two probe structures of FIG. 2 may be formed in a similar manner. FIG. 12 illustrates the layout of the probes and probe conductors on the substrate before the probe bodies are released from the substrate.

Figure 13:
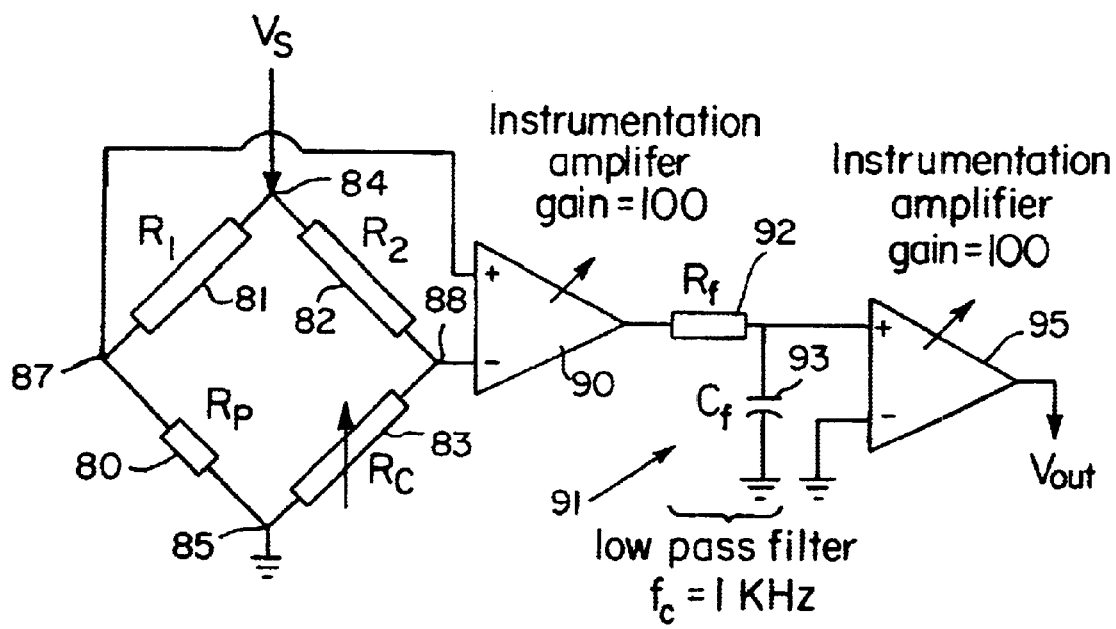
FIG. 13 is a schematic circuit diagram for an open loop interface circuit for the thermal probe in accordance with the invention.

FIG. 13 illustrates an open loop interface circuit that may be utilized to obtain probe temperature readout from the probe in accordance with the invention. The circuit of FIG. 13 has conductors connecting a Wheatstone bridge circuit composed of the probe resistance 80 (e.g., the resistance between the pads 32 and 33 of the probe of FIG. 1 or between the pads 53 and 54 for the probe of FIG. 2), two fixed resistors 81 and 82, and a variable control resistance 83. The control resistance may be a separate resistor for the probe of FIG. 1 or may be the reference probe resistance for the probe of FIG. 2 (the resistance between the pads 53 and 54). The supply voltage $V_s$ is applied between two nodes 84 and 85 of the bridge, with the output voltage from the bridge supplied from output nodes 87 and 88 of the bridge to the positive and negative inputs of an instrumentation amplifier 90. The output of the amplifier 90 is provided to a low pass filter 91 composed of a resistor 92 and capacitor 93 (e.g., with a cut-off frequency of about 1 KHz), with the signal from the low pass filter provided to a second instrumentation amplifier 95, referenced to ground, with the output of the amplifier 95 providing the output voltage $V_{out}$. In operation, sufficient current is passed through the probe resistor to induce joule heating at the probe tip. Thermal conductivity changes in the sample as the probe is scanned across the sample cause a change in probe tip temperature and a corresponding change in probe resistance. The probe temperature can be calculated using the following equations:

$$V_{out}=V_{offset}+10^4 \times V_s \times \{R_p/(R_1+R_p)-R_c/(R_2+R_c)\}.$$

$$R_p=R_0[1+TCR(T_p-T_0)]$$

Exemplary circuit parameters and components are:
Gain: $10^4$ V/V; $V_s$: 5V; $R_1$: 427.52Ω; $R_2$: 2052.9Ω; $R_f$: 73.5 KΩ; $C_f$: 2200 pF; IA: AD621

The probe can also be operated with constant probe temperature such that the power supplied by the circuit is equal to the power lost to the sample. Under this condition, the power loss at the tip can be related to the thermal conductivity of the sample in accordance with the following equations:

$$P_{tip} = 2\pi K_s \cdot a \cdot T_s = \frac{2\pi k_s \cdot a \cdot (T_p - T_0)}{1 + (2\pi k_s \cdot a / G_g)}$$

If $2\pi k_s \cdot a / G_g \ll 1$, $P_{tip} = 2\pi k_s \cdot a \cdot (T_p - T_0)$ where:
$P_{tip}$=supplied power by circuit
$K_s$=sample thermal conductivity
a=effective tip radius
$G_g$=contact thermal conductance
$T_p$=probe temperature
$T_s$=sample temperature under the probe
$T_0$=ambient temperature Heat loss from the tip to the sample is proportional to sample thermal conductivity, and is more sensitive for samples with low thermal conductivity.

Figure 14:
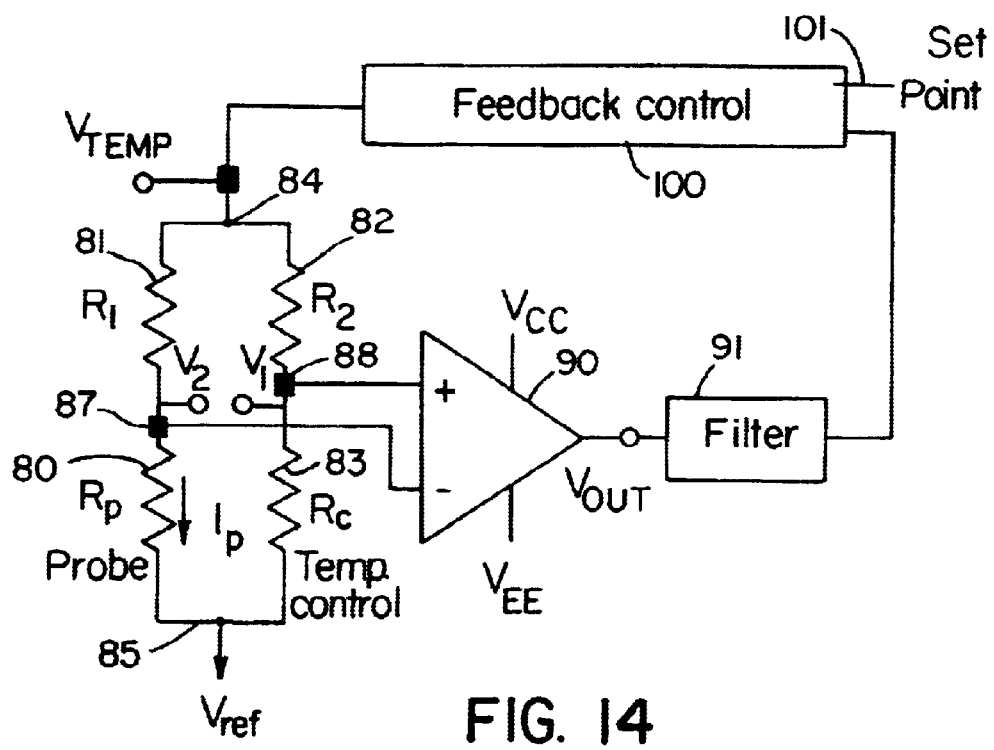
FIG. 14 is a circuit schematic for a feedback circuit for close loop thermal control for a thermal probe in accordance with the invention.

A feedback circuit that may be utilized to control the probe temperature in this manner is illustrated in FIG. 14. In this case, the output of the low pass filter 91 is provided to a feedback controller 100 that also receives a set point input 101. The output of the controller 100 is connected to the node 84 of the Wheatstone bridge. The current supplied by the controller 100 across the nodes 84 and 85 of the Wheatstone bridge is controlled to maintain essentially constant temperature, with the output voltage at the node 84, $V_{temp}$, constituting the output voltage signal from which the relative thermal conductivity of the sample may be determined.

As noted above, the surface of the cantilever at the beam distal end on the side opposite the probe tip may be coated with a reflective material (e.g., gold) tip to allow a laser beam to measure the position of the probe in a manner similar to that carried out in conventional atomic force microscopy (AFM). For example, scans were carried out using the Voyager scanning system with an Explorer scanning probe microscope manufactured by Topometrix. Topographic images were obtained by monitoring the laser deflection of the probe cantilever as in AFM, and the thermal image was obtained by monitoring the probe resistance change using the open loop circuit discussed above.

An exemplary probe constructed as shown in FIG. 1, with a 250 μm long by 50 μm wide by 3 μm thick cantilever beam, was measured and found to have a spring constant of 0.1 N/m, ten to fifty times lower than data storage probes and commercial wire probes, respectively. Such a small spring constant facilitates the scanning of soft materials, such as photoresists, even without the use of Z-axis feedback, since the very small force applied by the probe tip as it moves across the sample does not result in damage to the sample. An example of such measurements includes measurements of patterns in positive tone chemical amplified photoresist UV6™ from Shipley, which is a photoresist suitable for use in ultra-narrow line width ULSI lithography research. Unlike standard photoresists and polymethymethacrylate (PMMA), a photoacid generated by exposure permits thermolysis of the backbone polymer during the post exposure bake (PEB), which changes the solubility of the exposed regions of the resist and which releases isobutylene. The photoresist thickness decreases in exposed areas where the released isobutylene is evaporated during PEB. Topographic variations and thermal conductance variations due to thermolysis of the backbone can be mapped simultaneously by the probe of the invention by using the probe as an AFM probe as well as a thermal probe. The probe was found to have a spatial resolution of less than 50 nm. Linear scans of such samples with varying PEB times can be used to investigate image distortion due to acid diffusion during PEB. The thermal probe has also been used to measure the glass transition temperature and melting temperature of thin films with high sensitivity. Further, the thermal probe can be used to scan soft biological structures, such as a monolayer of tumor cells, with the thermal imaging from the probe providing information on internal cellular features.

The sensitivity of a bolometer-type probe is directly related to the temperature coefficient of resistance (TCR) of the sensing resistor. The measured TCR of the Ni and W thin films that constitutes the resistor $R_f$ for a sample probe of the type shown in FIG. 1 was 2963 ppm/K. This information permits the tip temperature to be calculated from the resistance change. The resistance measurements for this and other experiments reported here were performed using the four-probe technique by which the impact of contact resistance at the probe pads is eliminated.

Figure 15:
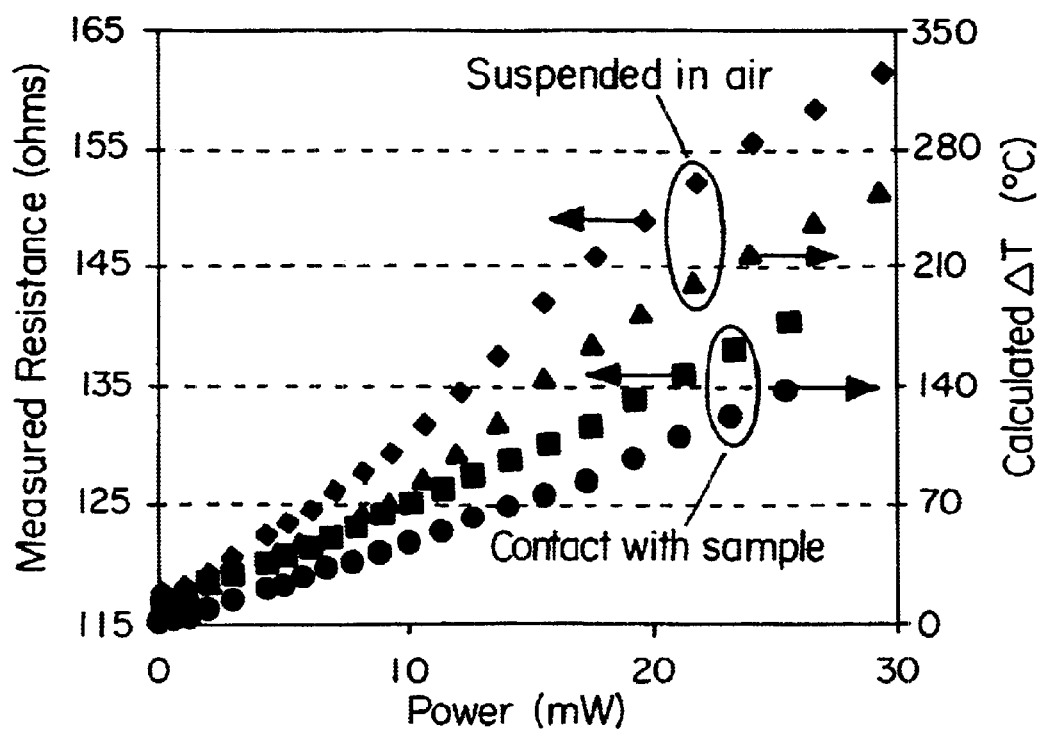
FIG. 15 are plots showing variation of probe resistance and calculated temperature as input power is increased, illustrating that when the probe is in contact with a sample, its temperature change per unit input power is smaller than when it is suspended in air.
Figure 16:
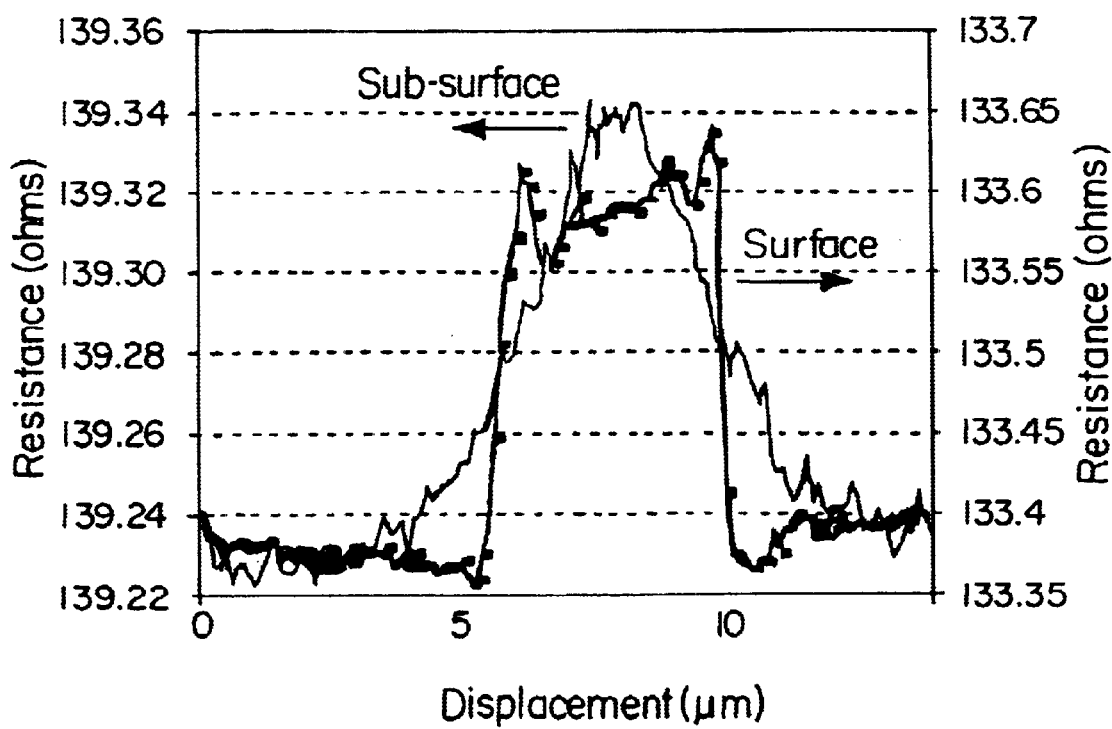
FIG. 16 are graphs showing resistance as a function of displacement for the thermal probe of the invention for a linear scan across a 3400 Å thick 5 $\mu$m metal line pattern on a glass substrate, along with a scan across a similar sample covered by a 1 $\mu$m thick layer of baked photoresist, indicating the ability to map the contrast in thermal conductivity in both superficial and subsurface layers.

FIG. 15 shows the resistance change in an example fabricated polyimide probe as the input power is increased. Using the measured TCR, the temperature change at the probe tip with 25 mW input power reaches 225° C. when the probe is suspended in air and the tip is not in contact with any sample. When the tip is brought into contact with a glass substrate, the conductive heat loss reduces the temperature change to 133° C. for the same input power. The electrical resistance of the probe can therefore be used to monitor the proximity of the tip to the sample. The probe used in these experiments was 350 μm long, 50 μm wide, and 3 μm thick. It had a calculated spring constant of about $6.5 \times 10^{-2}$ N/m, which is relatively low, and thus is well suited to scanning soft materials. The estimated contact force due to the deflection of the polyimide cantilever is $<10^{-9}$N. This probe was used to scan a 3400 Å thick, 5 μm wide metal line patterned on a glass substrate in order to test its ability to detect a contrast in thermal conductivity. The experiments were performed with the tip in contact with the sample. The tip was positioned with a micromanipulator, while the scanning motion was obtained from a piezoelectric bimorph. A linear scan that was obtained while supplying a constant current of 12 mA is shown in FIG. 16. A sharp change in probe resistance is evident as the tip traverses the metal line. The scan was repeated with the sample surface covered by a 1 μm thick layer of baked photoresist. The result is superimposed on the original scan in FIG. 16, and demonstrates that subsurface mapping can be performed.

Figure 17:
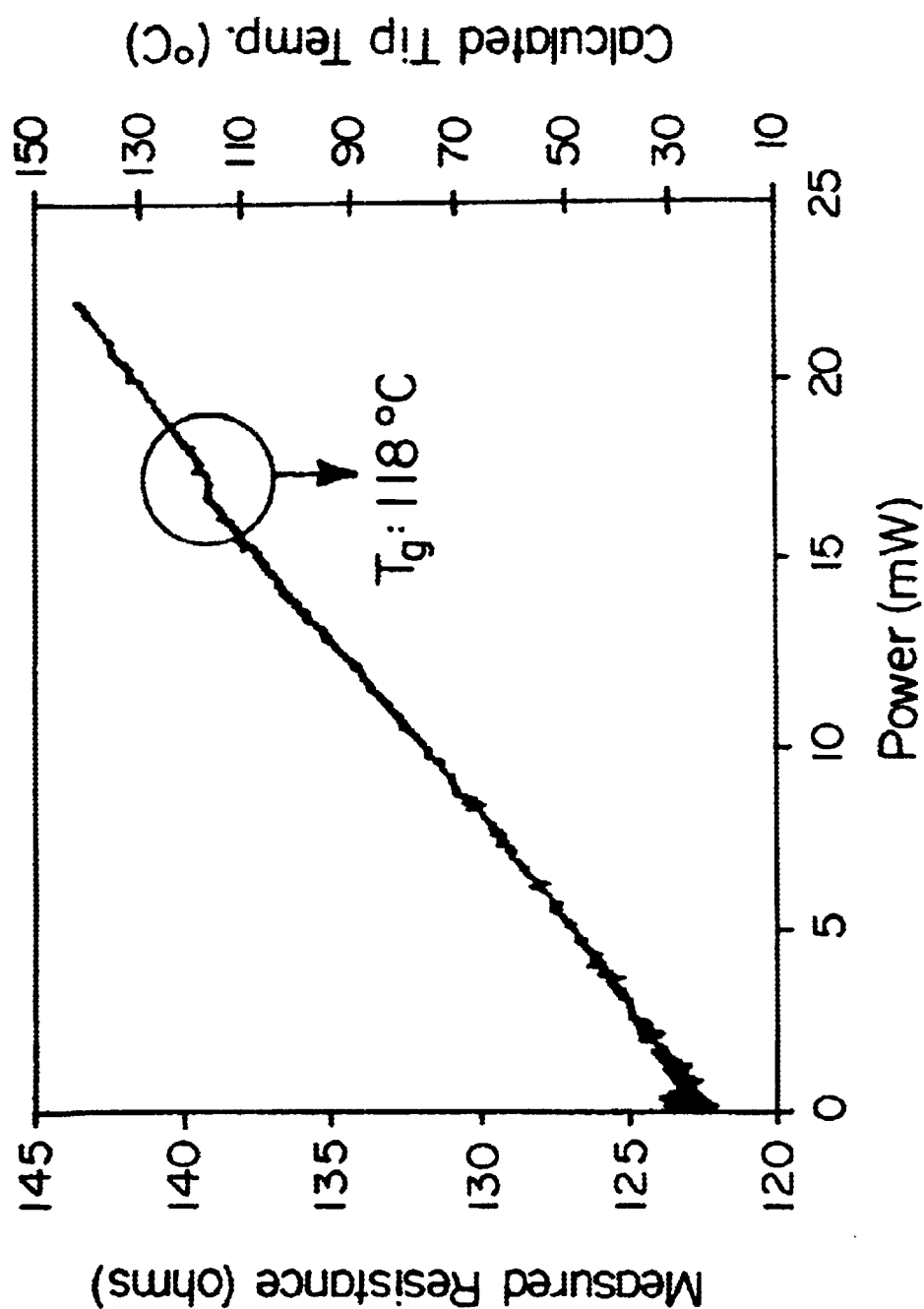
FIG. 17 are graphs of measured resistance versus power and illustrating the glass transition temperature of a photoresist.

The probe was also used to perform spatially localized measurements of the glass transition temperature $T_g$ of photoresists. FIG. 17 shows a plot of the probe resistance (and calculated tip temperature) versus input power for a glass sample covered with Shipley 1813 photoresist, which is used in I-line lithography. The location of the change in slope indicates that the $T_g$ is 118±1° C. This agrees with a previously published result obtained by an ultrasonic method which also found that the $T_g$ was 118° C. See S. L. Morton, F. L. Degertekin, and B. T. Khuri-Hakub, IEEE Trans. Semicond, Vol. 12, pp. 332 et seq. (1993). A similar measurement indicated that $T_g$ is 137±1° C. for the chemically amplified Shipley resist UV6, which is used in deep ultraviolet lithography. This measurement compares well with the value of 143±2.5° C. determined by the gradient of film stress on a full-wafer sample. The consistency of the measurements with expectations indicates that the probe can be used for photoresist research and analysis.

Although the invention has been illustrated utilizing a probe body formed of a flexible polymer such as polyimide, other materials such as silicon, silicon nitride and silicon dioxide can be used to form all or part of the probe body. Other micromachining processes, e.g., bulk micromachining, may be utilized to form such probes. A flexible material (e.g., kapton, paralene-C, etc.) may be used to form a hinge portion of the probe body by which a more rigid portion of the probe body is connected to the substrate.

Figure 18:
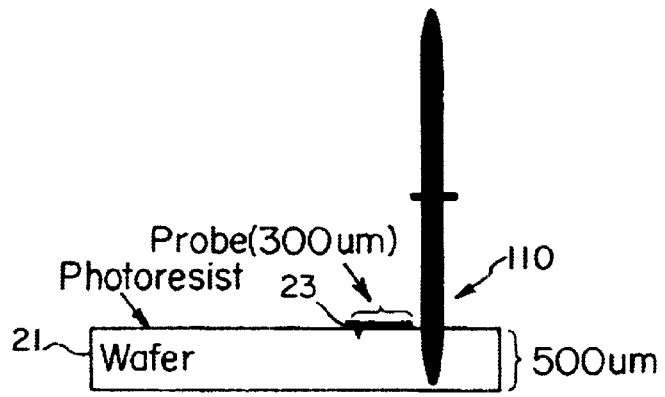
FIG. 18 is a simplified side view illustrating a conventional manner of dicing a substrate wafer adjacent to a probe formed on the substrate.
Figure 19:
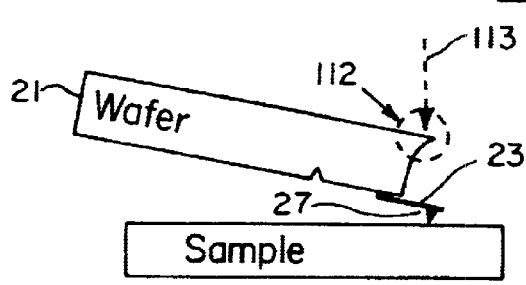
FIG. 19 is a view of the diced wafer produced in the manner shown in FIG. 18, illustrating an extending or extruded edge on the substrate for the probe that may result from using the conventional die cutting as shown in FIG. 18.
Figure 20:
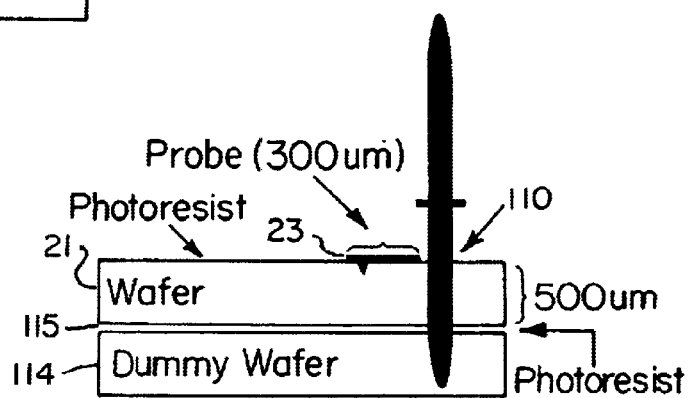
FIG. 20 illustrates a preferred die cutting arrangement in which a dummy wafer is bonded to the substrate wafer before die cutting.
Figure 21:
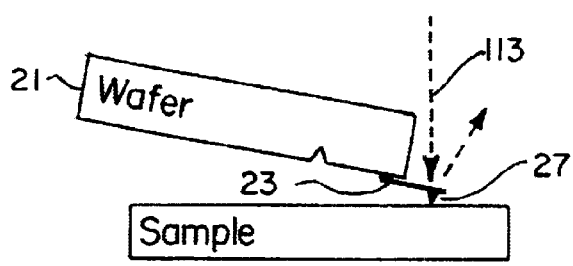
FIG. 21 illustrates the straight edge formed by die cutting the substrate wafer in the manner shown in FIG. 20.

In the process of manufacturing the probes in accordance with the invention, the wafer with the released probes thereon is diced before the probes are flipped over and bonded into their operative position. FIG. 18 illustrates a dicing blade 110 cutting through the wafer 21 adjacent to the probe body 23. However, dicing the wafer in this manner creates a small protrusion 112 at the edge of the die 21 generated by the curvature of the dicing blade. This curvature may be sufficient to at least partially block the laser beam, illustrated at 113 in FIG. 19. The effect of the curvature of the dicing blade may be significant given the typical dimensions of the probe body 23, e.g., in the range of 300 μm in length, whereas the thickness of a typical 3 inch wafer is about 500 μm. This problem may be avoided by bonding the substrate wafer 21 to a dummy wafer 114 with a thin photoresist film 115 as shown in FIG. 20. In this case, the dicing blade 110 cuts entirely through the wafer 21 and into the dummy wafer 114, forming a straight cut through the substrate wafer 21 to form a straight edge, as illustrated in FIG. 21, that does not interfere with the laser beam 113.

Figure 22:
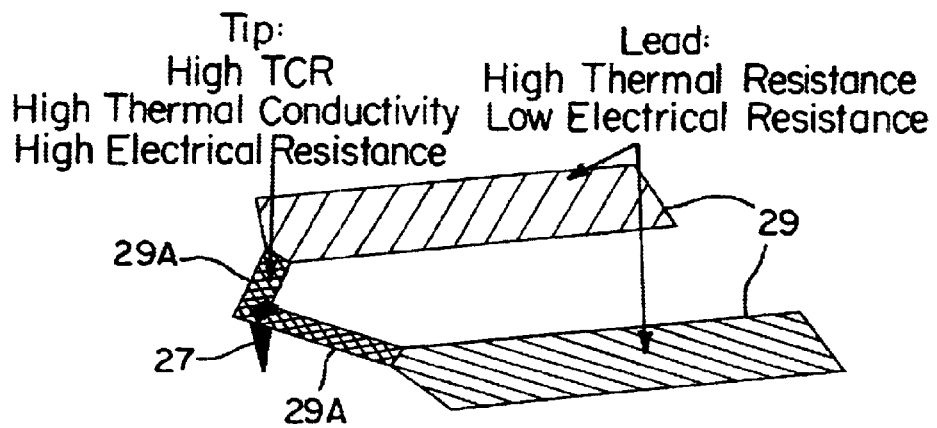
FIG. 22 is a simplified illustrative view of the electrical conductors leading to the probe tip in which the main lead conductors and the conductors at the tip are formed with different characteristics.

It is preferable to have different material characteristics for the conductors that extend over the length of the probe body and the conductors at the probe tip itself. This is illustrated schematically in FIG. 22 which shows the pair of lead conductors 29 for the probe of FIG. 1 extending to a position adjacent to the probe tip 27 and short conductors 29A which extend from the pair of lead conductors 29 to be electrically joined at the position of the probe tip 27. The lead conductors 29 are preferably wider and thicker than the tip conductors 29A, and have relatively low electrically resistance and relatively high thermal resistance to reduce the parasitic resistance of the probe and to effectively constrict the heat to the tip area. The material of the conductors 29A at the tip area should preferably be narrower and thinner and have a high TCR, high thermal conductivity, and high electrical resistance. In a thermocouple probe, two different materials form a junction at the probe tip. However, for a resistive (bolometer) probe, a junction between dissimilar materials at the probe tip is neither required nor favored. Examples of the materials that may be used for the lead conductor 29 and probe tip conductor 29A are separate layers of nickel and tungsten. For example, the lead sections 29 of the conductors may be formed of layers of both nickel and tungsten, whereas the conductor sections 29A at the tip may be formed of only one of the metals. Another example of a metal that may be utilized for the probe tip conductors 29A is gold. Further exemplary materials and dimensions include 15 μm wide and 0.4 μm thick gold film for the major conducting leads 29 and 7 μm wide and 0.1 μm thick platinum film for the tip conductor 29A. Similar conductor arrangements may be utilized in all of the probes discussed herein.

Figure 23:
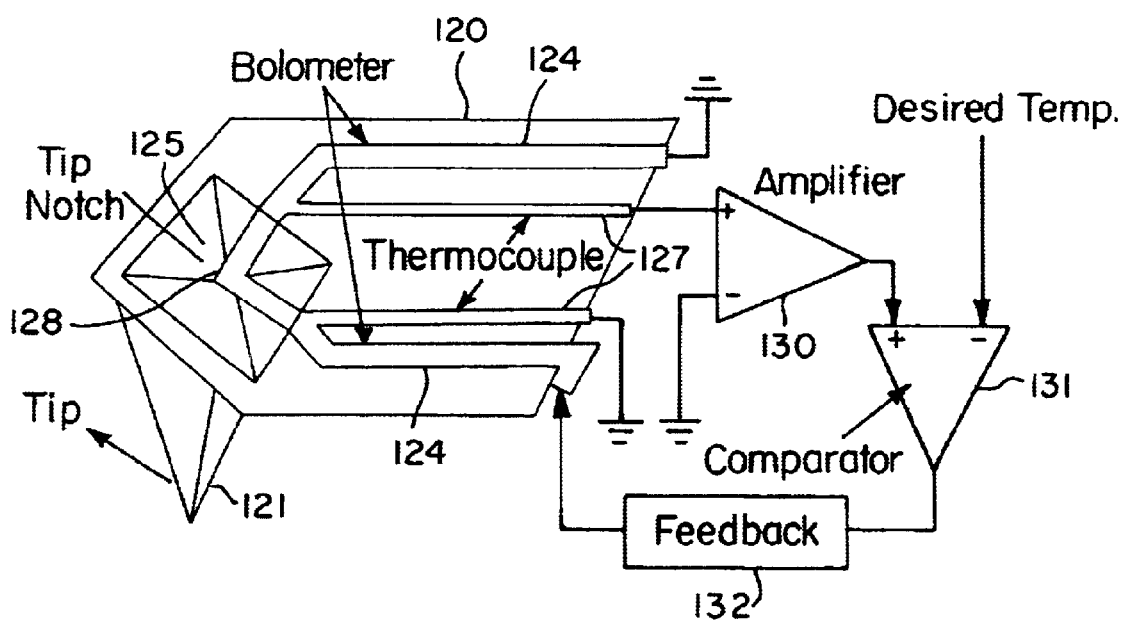
FIG. 23 is a simplified view of an embodiment of the probe in accordance with the invention which includes both thermocouple conductors and thermistor conductors on the same probe leading to the probe tip.

A thermocouple probe may provide temperature measurement which is superior to a bolometer probe, inasmuch as the output voltage of the thermocouple probe directly relates to the probe tip temperature. However, a bolometer probe can provide other functions such as thermal conductance mapping, subsurface imaging, and material thermal property measurements, with the probe tip temperature being determined from the probe resistance. A temperature calibration is generally required to eliminate the influence of environmental temperature and the probe lead resistance, because the probe resistance represents the average probe temperature, not the probe tip temperature. When the probe tip diameter is further reduced to provide better spatial resolution, the heat flow between the probe tip and the sample, that is proportional to the tip-sample contact area, is also further reduced. To measure the small heat loss variation (or probe resistance change) which is hidden within the supplied power that is used to maintain probe temperature (or probe resistance) requires a highly sensitive interface circuit. To overcome this problem, and to provide a thermal probe with self-temperature calibration, high sensitivity, and ease of integration with on-chip circuitry (with no calibration resistor), a probe may be utilized in accordance with the invention having integrated bolometer and thermocouple functions as illustrated in FIG. 23. The probe may have a probe body 120, formed as described above, with a tip 121. Conductors 124 form the bolometer conductor leads leading to a junction 125 at the tip, while conductors 127 form the thermocouple conducting leads which are joined at a junction 128 at the tip 121. The bolometer conductors 124 and thermocouple conductors 127 are separated by a thin insulating film (e.g., TI 2613 polyimide, 0.2 μm thick) with the thermocouple junction located at the probe tip 27 on top of the bolometer junction. The thermocouple is utilized to sense the tip temperature directly and as a feedback signal to control tip temperature, e.g., by providing the thermocouple signal to an amplifier 130 which provides its output to a comparator 131. The desired temperature is provided as the other input to the comparator 131, and the output of the comparator is provided to a feedback controller 132 that supplies the bolometer conductors 124. This arrangement provides self-temperature calibration and higher sensitivity. Since no external resistors are needed in the interface circuit, the interface circuit may be more easily integrated with the thermal probe using, e.g., CMOS technology. As is conventional in a thermocouple probe, the materials of the thermocouple conductors 127 at the junction 128 differ from each other to provide the thermocouple structure, as described, for example, in M. H. Li, et al., supra.

Figure 24:
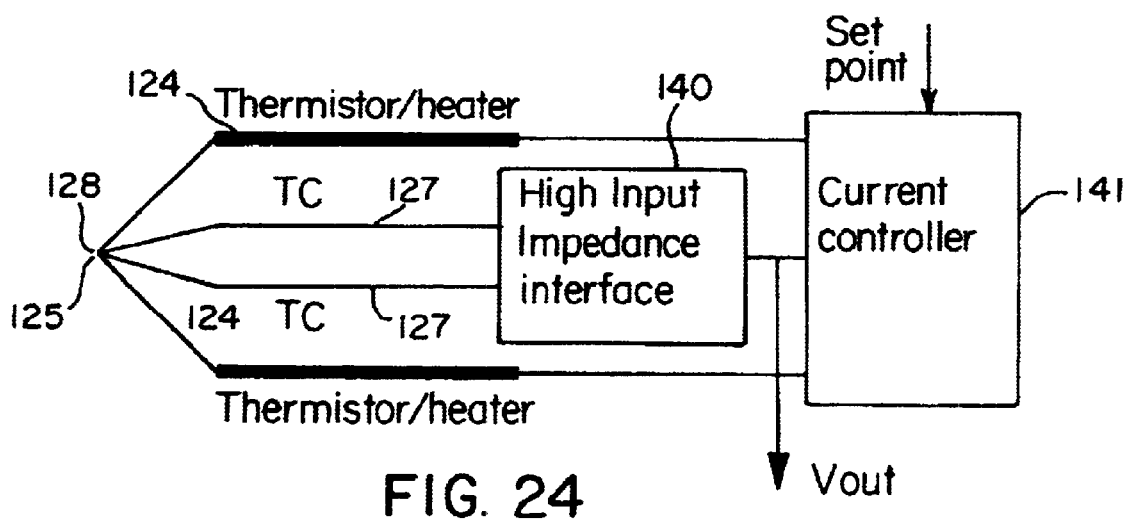
FIG. 24 is a schematic view of a modified version of the probe of FIG. 23 in which the thermocouple conductors and the thermistor conductors extend to junctions at the tip at the same surface level.

An alternative embodiment of the dual thermocouple and thermistor probe is shown in FIG. 24. In this embodiment, both the thermocouple and thermistor conductors are on the same plane and are not separated by an insulating layer. Current flow in the thermocouple conductors 127 is prevented by reading it out differentially through a high input impedance interface circuit 140 which provides its output to a current controller 141. The current controller 141 receives a set point command and provides current to the thermistor conductors 124. The embodiment of FIG. 24 is simpler to fabricate than the structure of FIG. 23, and provides better thermal contact between the thermocouple and thermistor at the junctions 125 of the thermistor and 128 of the thermocouple conductors.

The probe of the present invention can also be used to carry out scans while immersed in a liquid. A probe to carry out such measurements can be formed with all leads and transfer points on the substrate and a platform to which it is mounted coated with a thin film of polyimide to electrically insulate all such conductors from the liquid (e.g., water). Thermal conductance contrast mappings were obtained from a sample of thin film metal lines with both the probe and sample immersed in deionized water. Scan results were obtained without contact force feedback control, with a scan rate of 25 $\mu$m/sec. and resolution of 400 lines. The sample was 5 $\mu$m wide chromel (metal A: 300 nm thick), and Pt/Ti (metal B: 100 nm/20 nm thick) patterned on a Si substrate and isolated from it by a 0.75 $\mu$m thick silicon dioxide layer.

As discussed above, the tip of the probe may be formed with a good heat conducting material, e.g., a metal, that is thermally connected to the probe conductors so that heat flows freely from the tip to the conductors and vice versa. Generally, the metal of the tip and the probe conductors will be in direct contact and thus electrically connected also. This electrical connection does not significantly affect measurements made with the probe under water (or other liquid) since only the tip is exposed to the water and no circuit is formed to other electrical conductors, which are all covered with an insulating material. If desired, a thin electrical insulating layer may be formed between the metal of the probe tip and the probe conductors provided that the material does not substantially impede heat flow across it.

It is understood that the invention is not limited to the embodiments disclosed herein, but embraces all such modified forms thereof as come within the scope of the following claims.

What is claimed is:

1. A micromachined thermal probe comprising:
(a) a substrate with a surface and an edge;
(b) a flexible elongated probe body including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, a probe tip extending from the cantilever beam at the distal end of the beam in a direction away from the substrate surface at the junction of and thermally connected to the conductors, the elongated flexible probe body bent over and secured back to itself at the proximal end of the cantilever beam section by layers of gold that are compressively bonded together to form an anchor for the cantilever beam section of the probe body.

2. The thermal probe of claim 1 wherein the substrate is single crystal silicon.

3. The thermal probe of claim 1 wherein the pair of conductors in the probe body is formed of nickel and tungsten layers.

4. The thermal probe of claim 1 wherein the probe tip of the cantilever beam extends from a surface of the cantilever beam 5 to 6 $\mu$m.

5. The thermal probe of claims further including a layer of electrical insulator covering electrical conductors on the substrate so that the electrical conductors will not be exposed to a liquid in which the probe may be immersed.

6. The thermal probe of claim 1 wherein the probe body comprises two layers of flexible polymer joined together over the pair of conductors.

7. The thermal probe of claim 6 wherein the layers of polymer are formed of polyimide.

8. The thermal probe of claim 1 wherein the pair of conductors in the probe body is connected to conductors on the substrate surface that extend to contact pads on the substrate surface.

9. The thermal probe of claim 8 wherein the conductors on the substrate connect the pair of conductors of the probe body in series between two contact pads.

10. The thermal probe of claim 1 wherein the cantilever beam section has a beam width of less than 100 $\mu$m and a beam thickness of 3 to 10 $\mu$m.

11. The thermal probe of claim 10 wherein the cantilever beam section has a length in the range of 100 to 500 $\mu$m.

12. A micromachined thermal probe comprising:
(a) a substrate with a surface and an edge;
(b) a flexible elongated probe body including a cantilever beam section that extends from a proximal end thereof that is secured to the substrate surface outwardly from the edge of the substrate to a distal end thereof, a pair of thermistor conductors in the probe body extending to a junction at the distal end of the cantilever beam to allow passage of current through the thermistor conductors and through the junction, a pair of thermocouple conductors in the probe body extending to a junction of different metals forming a thermocouple at the distal end of the cantilever beam, a probe tip extending from the cantilever beam at the distal end of the beam in a direction away from the substrate surface at the junctions of and thermally connected to the conductors, the elongated flexible probe body bent over and secured back to itself at the proximal end of the cantilever beam section.

13. The thermal probe of claim 12 wherein the probe body comprises two layers of flexible polymer joined together over the pairs of conductors.

14. The thermal probe of claim 12 wherein the elongated flexible body secured to the substrate is bent over and secured back to itself at the proximal end of the cantilever beam section by layers of gold which are compressively bonded together to form an anchor for the cantilever beam section of the probe body.

15. The thermal probe of claim 12 wherein the probe tip of the cantilever beam extends from a surface of the cantilever beam 5 to 6 $\mu$m.

16. The thermal probe of claim 12 further including a layer of electrical insulator covering electrical conductors on the substrate so that the electrical conductors will not be exposed to a liquid in which the probe may be immersed.

17. The thermal probe of claim 12 wherein the cantilever beam section of the probe body has a beam width of less than 100 $\mu$m and a beam thickness of 3 to 10 $\mu$m.

18. The thermal probe of claim 17 wherein the cantilever beam section of the probe body has been a length in the range of 100 to 500 $\mu$m.

19. The thermal probe of claim 12 further including conductors electrically connecting the thermistor conductors in the probe body into two arms of a Wheatstone bridge circuit with resistances connected in two other arms of the Wheatstone bridge circuit, the Wheatstone bridge circuit having two supply nodes across which a supply voltage may be provided and two output nodes, a differential amplifier connected to the output nodes to provide an amplified output signal, and a low pass filter connected to the amplifier to low pass filter the signal therefrom.

20. The thermal probe of claim 19 further including a feedback control circuit connected to receive the output of the low pass filter and connected to the supply nodes of the Wheatstone bridge circuit to provide a voltage to the supply nodes to maintain a constant output voltage at the output nodes of the Wheatstone bridge circuit.

21. A micromachined thermal probe comprising:
(a) a substrate with a surface and an edge;
(b) a first flexible probe body including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction and thermally connected to the conductors; and
(c) a second, flexible probe body spaced from the first flexible probe body and including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction of and thermally connected to the conductors;
wherein the junction of the first flexible probe body is electrically connected by conductors to the junction of the second flexible probe body.

22. The thermal probe of claim/wherein the substrate is single crystal silicon.

23. The thermal probe of claim 21 wherein the pairs of conductors in each probe body are connected to conductors on the substrate surface that extend to cost pads on the substrate surface.

24. The thermal probe of claim 21 wherein the pairs of conductors in the probe bodies are formed of nickel and tungsten layers.

25. The thermal probe of claim 21 wherein the probe tips of the cantilever beams of the first and second probe bodies extend from a surface of the cantilever beam 5 to 6 $\mu$m.

26. The thermal probe of claim 21 further including a layer of electrical insulator covering all electrical conductors on the substrate so that the electrical conductors will not be exposed to a liquid in which the probe may be immersed.

27. The thermal probe of claim 21 wherein the first and second probe bodies each comprise two layers of flexible polymer joined together over the pair of conductors.

28. The thermal probe of claim 27 wherein the layers of polymer are formed of polyimide.

29. The thermal probe of claim 21, wherein the cantilever beam sections of the first and second probe bodies each have a beam width of less than 100 $\mu$m and a beam thickness of 3 to 10 $\mu$m.

30. The thermal probe of claim 29 wherein the cantilever beam sections of the first and second probe bodies have a length in the range of 100 to 500 $\mu$m.

31. The thermal probe of claim 21 further including conductors electrically connecting the conductors in each of the probe bodies into two arms of a Wheatstone bridge circuit with resistances connected in two other arms of the Wheatstone bridge circuit, the Wheatstone bridge circuit having two supply nodes across which a supply voltage may be provided and two output nodes, a differential amplifier connected to the output nodes to provide an amplified output signal, and a low pass filter connected to the amplifier to low pass filter the signal therefrom.

32. The thermal probe of claim 31 further including a second amplifier connected to receive the output of the low pass filter and providing an amplified output signal from which the probe temperature can be determined.

33. The thermal probe of claim 31 further including a feedback control circuit connected to receive the output of the low pass filter and connected to the supply nodes of the Wheatstone bridge circuit to provide a voltage to the supply nodes to maintain a constant output voltage at the output nodes of the Wheatstone bridge circuit.

34. A micromachined thermal probe comprising:
(a) a substrate with a surface and an edge;
(b) a flexible probe body including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, a probe tip extending from the cantilever beam at the distal end of the beam in a direction away from the substrate surface at the junction of and thermally connected to the conductors, the probe body comprising two layers of flexible material joined together over the pair of conductors; and
(c) conductors electrically connecting the conductors in the probe body into an arm of a Wheatstone bridge circuit with resistances connected in other arms of the Wheatstone bridge circuit, the Wheatstone bridge circuit having two supply nodes across which a supply voltage may be provided and two output nodes;
wherein the layers of polymer are formed of polyimide; and wherein the flexible probe body is bent over and secured back to itself at the proximal end of the cantilever beam section by layers of gold which are compressively bonded together to form an anchor for the cantilever beam section of the probe body.

35. A micromachined thermal probe comprising:
(a) a substrate with a surface and an edge;
(b) a first flexible probe body including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction and thermally connected to the conductors;
(c) a second flexible probe body spaced from the first flexible probe body and including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction of and thermally connected to the conductors;

wherein the pairs of conductors in each probe body are connected to conductors on the substrate surface that extend to contact pads on the substrate surface; and wherein the conductors on the substrate connect the pairs of conductors of each probe body in series between two contact pads.

36. A micromachined thermal probe comprising:

(a) a substrate with a surface and an edge;

(b) a first flexible probe body including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction and thermally connected to the conductors; and (c) a second flexible probe body spaced from the first flexible probe body and including a cantilever beam section that extends from a proximal end thereof that is secured to the substrate surface outwardly from the edge of the substrate to a distal end thereof, a pair of conductors in the probe body extending to a junction at the distal end of the cantilever beam to allow passage of current through the conductors and through the junction, and a probe tip extending from the cantilever beam at the distal end of the beam in a direction away from the substrate surface at the junction of and thermally connected to the conductors;

wherein the first and second probe bodies each comprise an elongated flexible body secured to the substrate that is bent over and secured back to itself at the proximal end of the cantilever beam section by layers of gold which are compressively bonded together to form an anchor for the cantilever beam section of the probe body.

37. A method of forming a micromachined thermal probe comprising:

(a) providing a substrate with a surface and an edge;

(b) forming a flexible probe body on the substrate surface with the probe body secured to the substrate surface at a proximal end adjacent to the edge, the probe body including a cantilever beam section that extends from the proximal end to a distal end thereof, a pair of conductors in the probe body extending to a junction at the distal end of the cantilever beam to allow passage of current through the conductors and through the junction, a probe tip extending from the cantilever beam at the distal end at the junction of and thermally connected to the conductors;

(c) forming a first gold layer on the flexible probe body at a position at the proximal end of the probe body at which the probe body is secured to the substrate and forming a second layer of gold on the probe body spaced from the first layer of gold;

(d) freeing the flexible probe body from the substrate except at the proximal end at which the probe body is secured to the substrate and bending the flexible probe body back until the second gold layer contacts the first gold layer and compression bonding the gold layers together to form an anchor for the cantilever beam section of the probe body.

38. The method of claim 37 wherein in the step of forming the flexible probe body, the probe body is formed of two layers of flexible polyimide polymer joined together over the pair of conductors.

39. The method of claim 37 wherein in the step of forming the flexible probe body, the probe body is formed to have a width of less than 100 $\mu$m, a thickness of 3 to 10 $\mu$m, and a length from the proximal end to the distal end of from 100 to 500 $\mu$m.

* * * * *

UNITED STATES PATENT AND TRADEMARK OFFICE
CERTIFICATE OF CORRECTION

PATENT NO.    : 6,692,145 B2
DATED         : February 17, 2004
INVENTOR(S)   : Yogesh B. Gianchandani et al.

It is certified that error appears in the above-identified patent and that said Letters Patent is hereby corrected as shown below:

Column 1,
Line 3, after the title, and before "FIELD OF THE INVENTION," insert the following paragraph:
-- REFERENCE TO GOVERNMENT RIGHTS
This invention was made with United States government support awarded by the following agency: NSF 9985422. The United States government has certain rights in this invention. --

Column 12,
Line 1, "claims" should be -- claim 1 --

Column 13,
Line 40, "claim/" should be -- claim 21 --
Line 44, "cost" should be -- contact --

Column 15,
Line 14, "and-an" should be -- and an --

Signed and Sealed this

Eighth Day of February, 2005

JON W. DUDAS
*Director of the United States Patent and Trademark Office*